No. 703,716. Patented July 1, 1902.
H. F. BROWN.
WATER METER.
(Application filed Nov. 11, 1901.)
(No Model.)
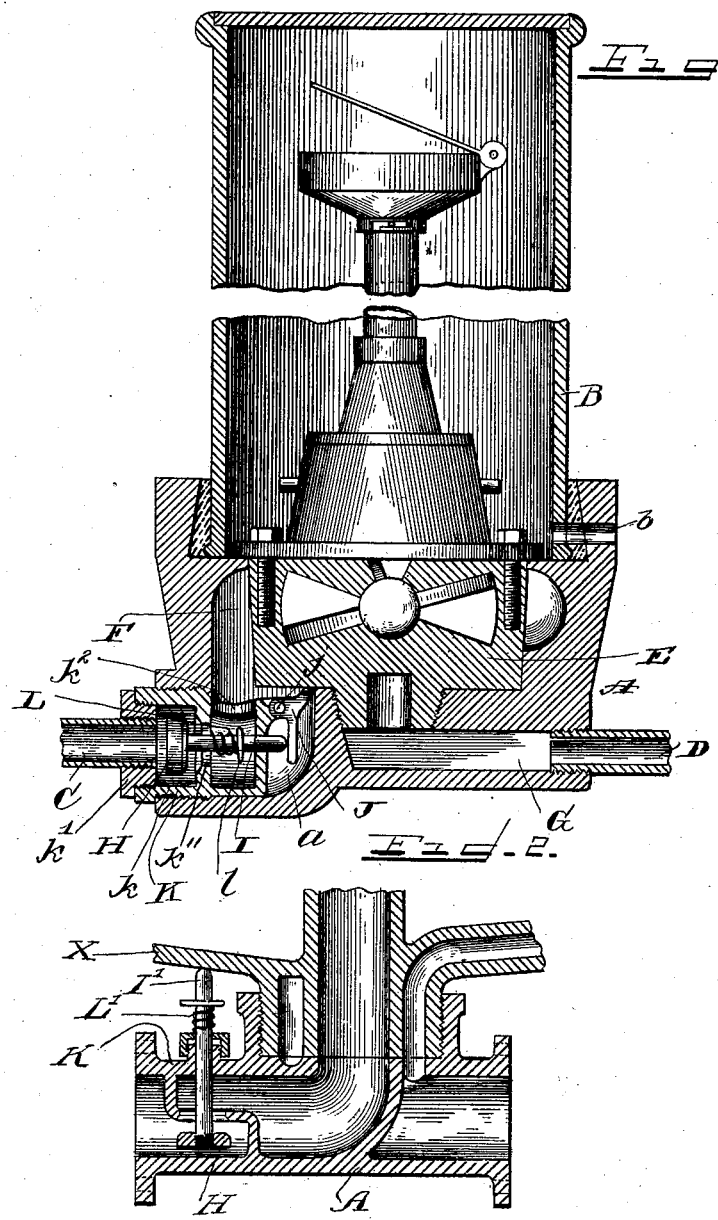

UNITED STATES PATENT OFFICE.

HARRY F. BROWN, OF CHICAGO, ILLINOIS.

WATER-METER.

SPECIFICATION forming part of Letters Patent No. 703,716, dated July 1, 1902.

Application filed November 11, 1901. Serial No. 81,873. (No model.)

*To all whom it may concern:*

Be it known that I, HARRY F. BROWN, a citizen of the United States, residing at Chicago, in the county of Cook and State of Illinois, have invented certain new and useful Improvements in Water-Meters, of which the following is a specification.

The present invention relates more particularly to that class of meters that are adapted to be used out of doors and connected in the waterway at a level below the frost-line. Such meters are usually protected by a meter-box, which may be made of metal or of masonry and extends to the surface level of the ground and is there provided with a suitable closure. It is sometimes necessary or desirable to remove these meters, or at least their working parts, for the purpose of inspection or repair, and when this is done means must be provided for closing the waterway until the meter or the removed part of it is replaced or some other device through which the waterway is completed during the absence of the meter or its removable part is replaced. The common practice is to place in the waterway between the street-main and its connection with the meter a stop-cock adapted to be manually operated by a key, which is presented to it either through the meter-box or through a separate stop-cock box. The objection to a separate stop-cock box is that it adds materially to the cost, and, furthermore, being of small diameter it is apt to and frequently does become choked or filled up with dirt, which must be removed before the key can reach the stem of the stop-cock. Placing the stop-cock within the meter-box is open to the objection that it makes it necessary to use a box of larger diameter than would otherwise be required, thus adding to the cost of the outfit. Still another objection to a manually-operated stop-cock is that regardless of its location the closing of it is apt to be neglected by careless workmen, the consequence being a waste of water and a flooding of the ground or street in the vicinity of the meter-box.

The object of the present invention is to provide means whereby the waterway is automatically closed the instant the meter or some part of it is removed and again automatically opened by the replacing of the meter or its removed part aforesaid. To this end I place in the waterway on the street-main side of the meter a valve which closes with the water-pressure or in the direction of the flow of the water, and I provide means adapted to contact with the meter or some removable part thereof, so that as said meter or said removable part thereof is being connected up in the waterway it will unseat the valve and will hold it unseated so long as the meter or said removable part thereof is in place and will also allow said valve to seat automatically and close the waterway as the meter or said removable part thereof is being removed.

The invention is not limited to a meter of any particular construction and is in no wise concerned with the character of the meter-casing or the moving system, but relates solely to means for automatically unseating a check-valve in the waterway as the meter or some part thereof is being put in place and allowing said valve to automatically seat or be seated as the meter or some part thereof is being removed. I believe myself to be the first to do this, and I therefore desire it to be understood that in its broad aspect the invention is not limited to the particular mechanism hereinafter described.

In the accompanying drawings, which are made a part of this specification, Figure 1 is a view of a meter embodying the invention in its preferred form, some of the parts being shown in elevation and others in vertical section. Fig. 2 is a similar view of a meter embodying some features of the invention in modified form.

In Fig. 1, A represents a fitting which forms the base of the meter proper and also the base of the meter-box, the tubular portion of which is shown at B. This fitting is permanently connected in the waterway, a portion of the service-pipe between the meter and street-main being shown at C and a portion of said pipe between the meter and the consumer's premises being shown at D. The meter here shown is constructed as shown and described in my pending application, Serial No. 70,889, to which reference may be had for a more complete understanding of its construction and operation. For the purposes of this application it is sufficient to say that it has a piston-casing E, removably seated in a socket in the base A, the piston-chamber being provided with inlet and outlet ports communicating with the inlet and outlet ports F and G, respectively, of the base or fitting A.

In the waterway upon the street-main side of the meter is located a valve H, which is adapted to open against and close with the water-pressure, and between this valve and the removable part E of the meter is interposed mechanism which unseats the valve as said removable part is being seated upon the base or fitting A and which holds said valve unseated so long as said removable part E remains in place and which permits said valve to seat and close the waterway as said removable part is being taken away. This mechanism preferably consists of a stem I, carrying the valve H, and a lever J, one arm of which engages the valve-stem, while the other arm of which is in position to be engaged by the removable part E. The lever is shown, Fig. 1, as being of the bell-crank variety and fulcrumed to the base or fitting A, and while this is preferred it is not essential so far as the broad features of the invention are concerned.

The seat for the valve is shown as formed within a valve-casing K, externally threaded and screwed into a socket in the base or fitting A. The casing has a chamber $k$, containing the valve, a plug $k'$, closing the chamber and provided with a threaded opening for receiving the threaded end of the pipe C, a spider $k''$ for guiding the valve-stem, and a port $k^2$, which communicates with the port F of the base or fitting A. The end of the valve-casing is perforated for the passage of the valve-stem, which contacts with the lever J within a chamber or recess $a$ in the base or fitting A, by which latter the lever J is supported through the medium of a pivot-pin $j$.

A coiled spring L, which surrounds the valve-stem I and bears in one direction against said stem through the medium of a pin $l$ and in the other direction against the spider $k''$, aids in seating the valve.

With the construction above described it is manifest that so long as the removable part E remains in place it will, acting through the medium of the stem I and lever J, hold the valve unseated. It is also manifest that as the removable part is being taken away the valve H will be seated by the combined influence of the spring L and the water-pressure against it. During the seating of the valve some water may escape past the part E and into the meter-box, and to provide for the escape of this the meter-box is provided with a leak-hole $b$. It is also manifest that as the part E is being put in place operations the reverse of those last described will take place.

In the construction above described only a part of the meter is removable, and this removable part controls the valve H; but I desire to have it understood that the invention contemplates in its broadest aspect a construction in which the entire meter, including its casing and all parts of it, is removable as a whole, and hence in Fig. 2 I have shown a construction in which the meter X is removable in its entirety. The meter-casing here shown may be constructed as shown in United States Letters Patent No. 587,125, granted July 27, 1897, to A. H. Kennedy. The lower part of its base is removably attached to a fitting A', permanently connected in the waterway, and within this fitting is a check-valve H', adapted to seat with the water-pressure, a spring L' being provided to insure its seating when not restrained. The stem I' of the valve passes out through the valve-casing K' and within reach of the casing of the meter, so that as the meter is being put in place it will engage the stem and unseat the valve and hold it unseated until the meter is removed, whereupon the water-pressure, aided by the spring, will automatically seat the valve and close the waterway.

What I claim as new, and desire to secure by Letters Patent, is—

1. In a water-meter, the combination with a fitting having inlet and outlet ports and adapted to be permanently connected in the waterway, of a valve for controlling the inlet-port, a removable piston-casing, means for detachably connecting said piston-casing and fitting, and means interposed between the piston-casing and valve whereby when said piston-casing is being put in place its movement is transmitted to the valve and the valve thereby unseated, the piston-casing being provided with inlet and outlet ports, communicating with the inlet and outlet ports, respectively, of the fitting, substantially as described.

2. In a water-meter, the combination with a fitting adapted to be permanently connected in the waterway, said fitting having a seat for a piston-casing and having inlet and outlet ports one end of each of which terminates at said seat, of a removable piston-casing adapted to occupy said seat and having inlet and outlet ports communicating with the inlet and outlet ports, respectively, of the fitting, a valve for controlling the inlet-port of the fitting, and means interposed between said valve and the piston-casing whereby when the piston-casing is being put in place its movement is transmitted to the valve and the valve thereby unseated, substantially as described.

3. In a water-meter, the combination with a fitting adapted to be permantly connected in the waterway and having inlet and outlet ports, a removable piston-casing having inlet and outlet ports communicating with the inlet and outlet ports, respectively, of the fitting, a valve located in the waterway, on the street-main side of the meter, and adapted to control the inlet-port of the fitting, and means interposed between the valve and the piston-casing for transmitting movement from the piston-casing to the valve, substantially as described.

4. In a meter the combination with a base adapted to be permanently connected in the waterway and having a socket, of a piston-casing removably seated in said socket, a valve located in the waterway, on the street-main side of the meter, and adapted to seat with the water-pressure, a movable part contacting with the piston-casing, and means for transmitting the movement of said part to the valve, substantially as set forth.

5. In a water-meter, the combination of a base adapted to be permanently connected in the waterway, a piston-casing removably seated upon the base, a valve-casing included in the waterway, said base being provided with a socket in which said valve-casing fits, a valve, in said casing, adapted to seat with the water-pressure, a stem carrying the valve, and a lever, one arm of which engages the valve-stem and the other arm of which is engaged by the piston-casing, substantially as described.

HARRY F. BROWN.

Witnesses:
JOHN S. KUMOLSEY,
L. M. HOPKINS.